United States Patent [19]
Land et al.

[11] 3,714,879
[45] Feb. 6, 1973

[54] REFLEX CAMERA

[75] Inventors: Edwin H. Land, Cambridge; Igor Blinow, Millis; Vaito K. Eloranta, Needham, all of Mass.

[73] Assignee: Polaroid Corporation, Cambridge, Mass.

[22] Filed: April 16, 1971

[21] Appl. No.: 134,733

[52] U.S. Cl. ............................................ 95/42, 95/13
[51] Int. Cl. ............................................ G03b 19/12
[58] Field of Search ............................. 95/13, 14, 42

[56] References Cited

UNITED STATES PATENTS

| | | | |
|---|---|---|---|
| 3,405,617 | 10/1968 | Land et al. | 95/13 |
| 3,537,370 | 11/1970 | Wareham | 95/13 R |
| 3,040,642 | 6/1962 | Keller et al. | 95/14 |

Primary Examiner—Joseph F. Peters, Jr.
Assistant Examiner—Richard A. Wintercorn
Attorney—Brown & Mikulka

[57] ABSTRACT

A fully automatic single-lens reflex camera configured to be foldable into a thin, compact shape suited for convenient carrying in the pocket of a garment. Thinness is achieved through a placement of a motor source adjacent one side of a rectangular film cassette within the housing of the camera and a roll-type processing station adjacent an opposite side of the cassette. A gear train having two branch circuits is coupled within the camera housing between the motor and the processing station along a third side of the film cassette. Reflex operation of the camera is carried out in response to movement of a kinematic linkage including a ram extending along the length of the elongate gear train. Through selective dual energization of the motor, this reflex operator assembly is moved by the kinematic linkage between viewing and exposure positions.

44 Claims, 13 Drawing Figures 3,714,879
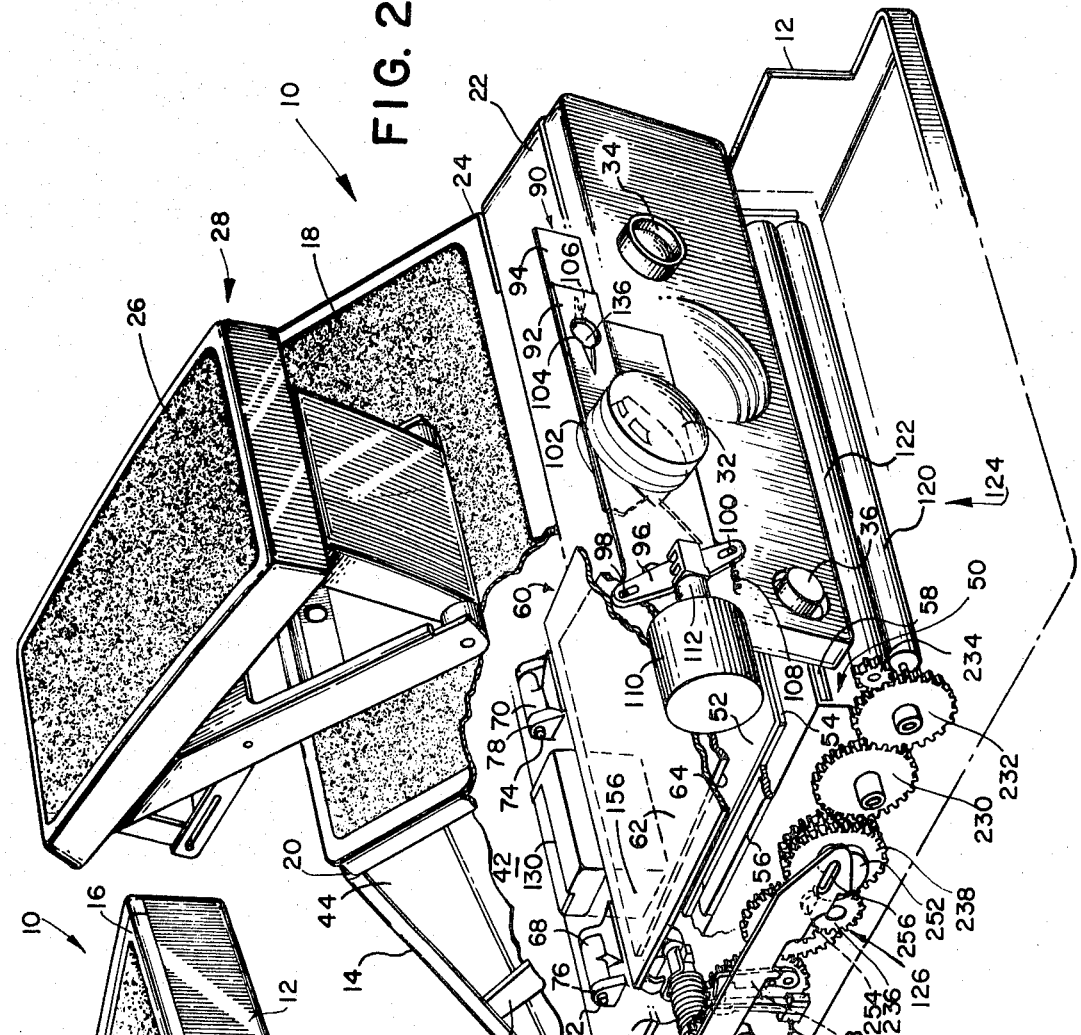
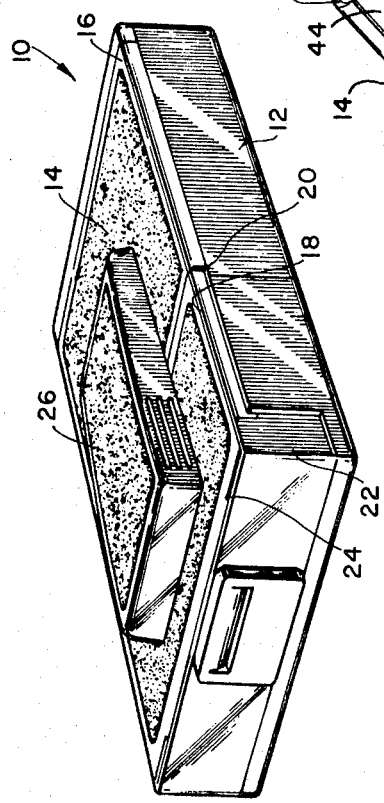
INVENTORS
EDWIN H. LAND
IGOR BLINOW
VAITO K. ELORANTA
BY *Brown and Mikulka*
and
*Gerald L. Smith*
ATTORNEYS

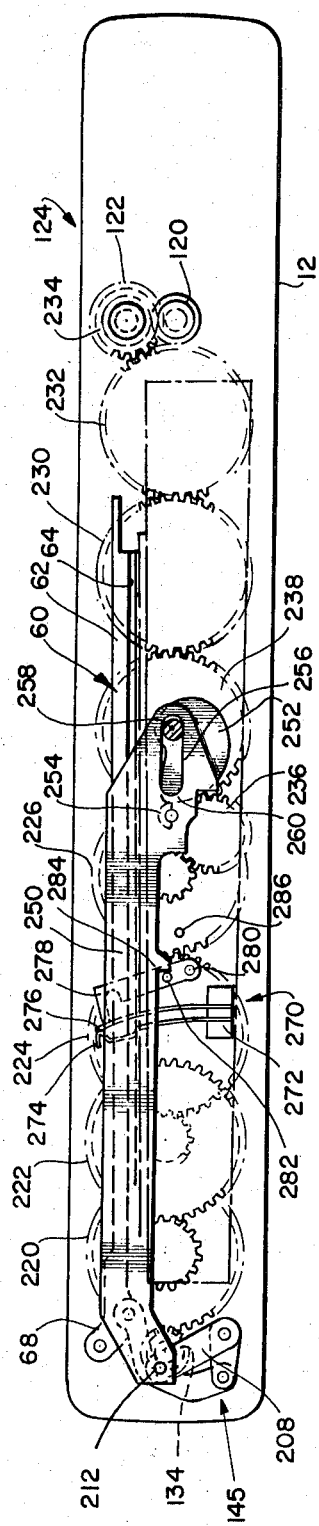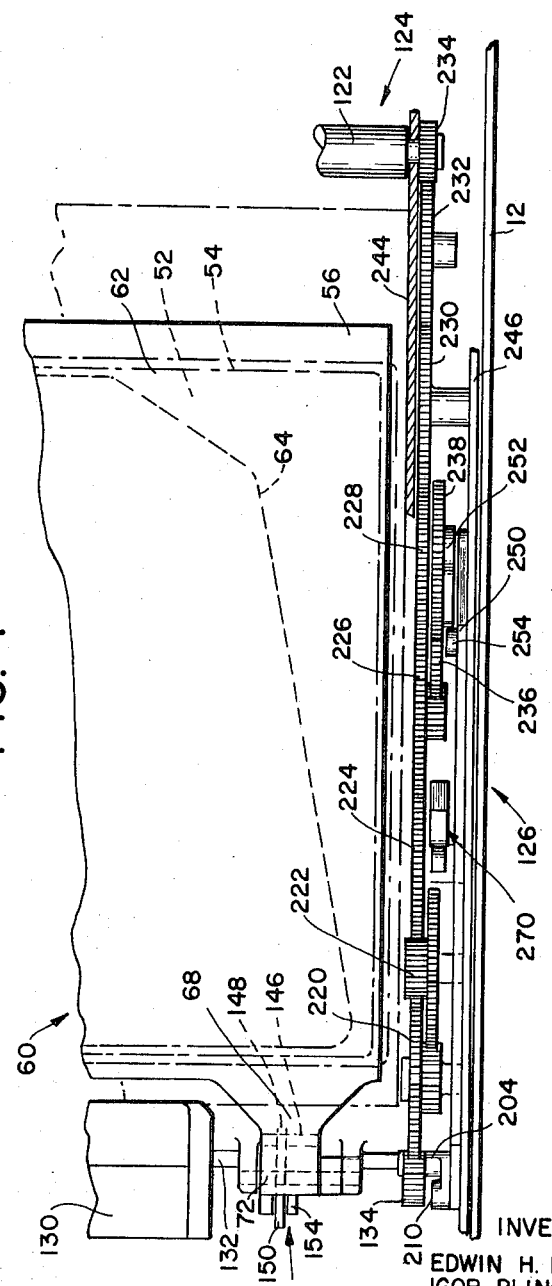
FIG. 4
FIG. 3
INVENTORS.
EDWIN H. LAND
IGOR BLINOW
VAITO K. ELORANTA
BY Brown and Mikulka
and
Gerald L. Smith
ATTORNEYS

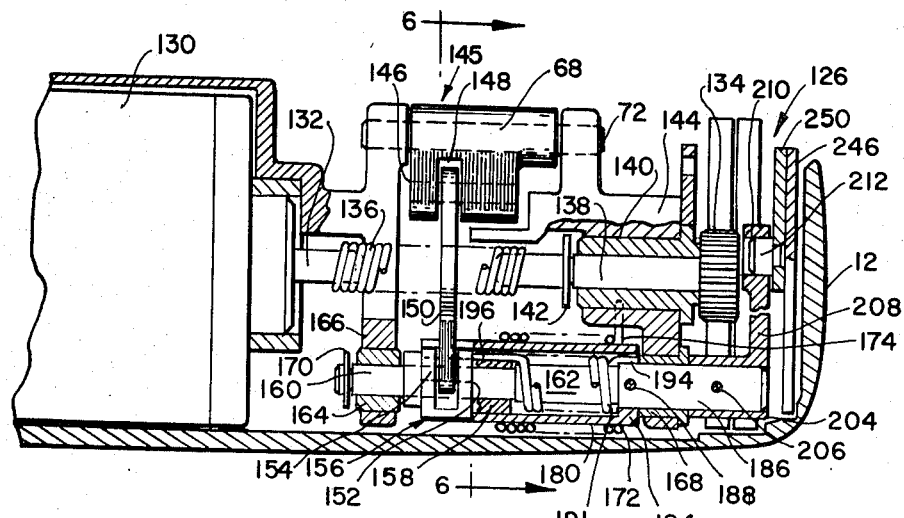

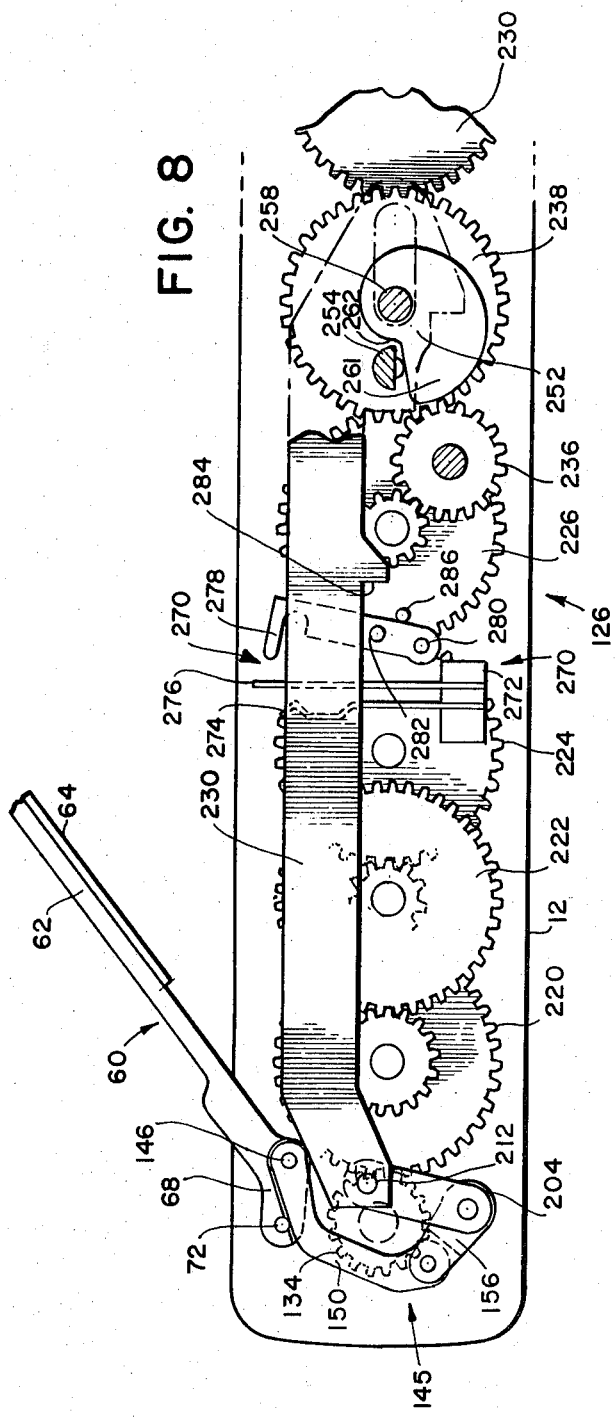

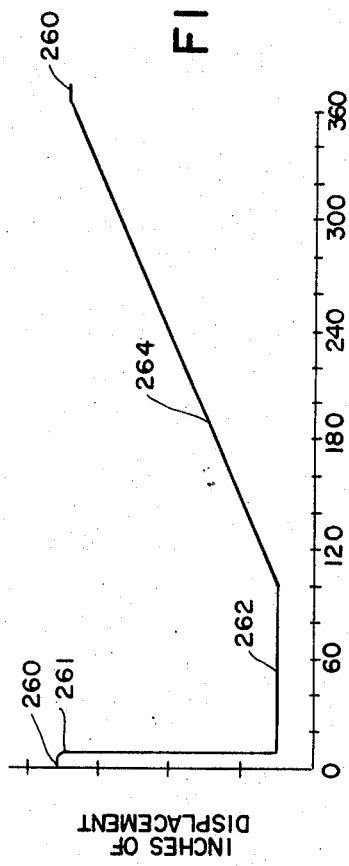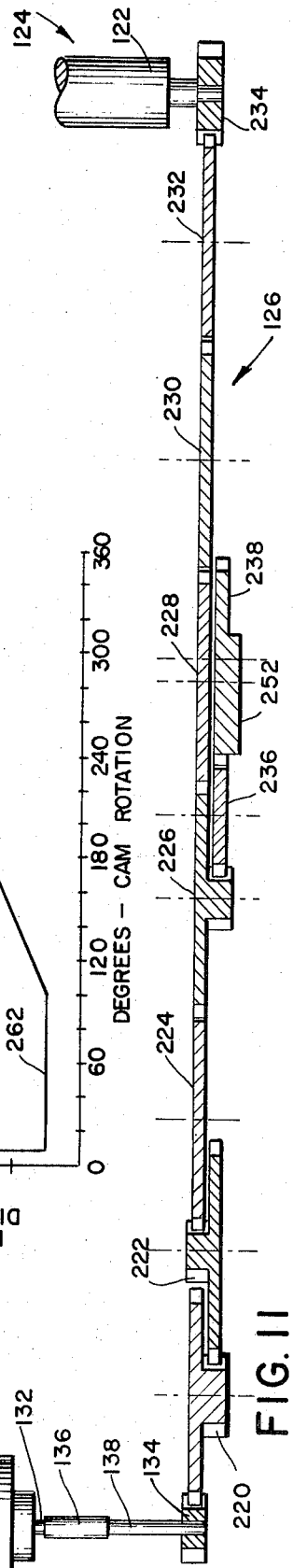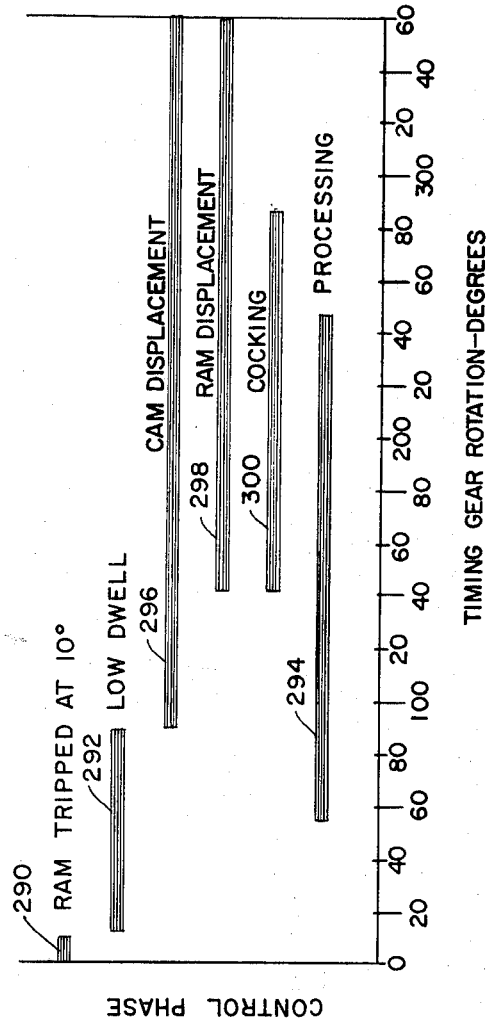

INVENTORS
EDWIN H. LAND
IGOR BLINOW
VAITO K. ELORANTA
BY Brown and Mikulka
and
Gerald L. Smith
ATTORNEYS

REFLEX CAMERA

BACKGROUND OF THE INVENTION

A camera which performs in fully automated fashion while being structured so thinly and compactly as to be carried conveniently in the pocket of a garment has been an elusive subject of technical inquiry. Difficulties in the path of evolution of such a camera become more evident when the large number of features which ideally are incorporated within it are considered. For instance, a fully automated photographic system desirably includes an optimum viewing and focusing system, fully automatic exposure control and motorized automatic processing. These sub-systems should all perform in proper sequence in response to the simple procedure of depressing a shutter release button. In effect, the fully automatic cameras represent an instrumentality incorporating a complex multi-step process control system.

For purposes providing optimum viewing performance as well as structural compactness, the automated cameras preferably utilize a form of single-lens reflex viewing. As described and claimed in a copending application for patent by E. H. Land, entitled "Reflex Camera," filed Apr. 14, 1970, Ser. No. 28,567 and assigned in common herewith, such reflex cameras normally assume a viewing mode configuration in which their exposure plane is isolated from scene illumination by a flat movable operator or mirror and viewing surface assembly. In a viewing configuration, the operator assembly serves the function of providing a surface upon which a scene, in reflex fashion, may be framed and focused in preparation for an exposure. In accordance with a modified single-lens reflex optical operation, depression of a start button on the camera commences a multi-step control causing its components to assume an orientation securing an exposure chamber by closing its shutter through an electromagnetic drive system. When this chamber is secured, the camera is caused to commence an exposure mode operation in which the earlier described operator assembly is released for movement under spring drive to uncover the exposure plane and provide a revised reflex optical path for subsequent exposure of the previously imaged scene. As an exposure mode configuration is achieved, the automatic exposure control sub-system of the camera cycles through a regulated exposure interval, following which the shutter again closes to secure the exposure chamber. The control system of the camera is then called upon to cock the operator assembly by driving it from an electrical motor into its viewing mode configuration. Before the photographic cycle is completed, an exposed photosensitive film unit is automatically removed from its position at the exposure plane and drawn through a motor driven rotating processing station.

When the operator assembly has been cocked or returned to its orientation covering the exposure plane, the shutter is again opened to its maximum extent and the camera is ready for a next succeeding photographic cycle.

The series of above-catalogued process control or operational events occurring throughout a photographic cycle illustrates the need for meeting the following design criteria: providing for an accurate physical monitoring of each operation to insert a requisite input to a closed loop electronic control network; providing a controlled power input for recocking the operator assembly following an exposure; providing accurately regulated drive input for a rotative film processing system; providing for an accurately timed mechanical release of the operator assembly to cause the camera to convert from a viewing operational mode into an exposure operational mode; and incorporating all of the above features within the extremely limited confines of a thin, compact camera structure suited to be conveniently carried within a pocket of a garment.

SUMMARY OF THE INVENTION

The present invention is addressed to a new thin and compact single-lens reflex camera which is fully automatic. This automatic operation is carried out to perform the above-described series of control functions through the use of a control network operating in conjunction with a motor power source, a speed reduction and system kinematic drive assembly. The ideally thin and compact shape of the automatic camera is realized through a unique geometry of association of various control functions therewithin. For instance, the housing of the camera is configured as a thin parallelepiped, the central portion of which removably supports a somewhat rectangular cassette or the like retaining a quantity of film, one film unit of which is positioned at an exposure plane. The motor for powering control and processing functions is mounted within the housing adjacent one side of the cassette and a film unit processing station is mounted adjacent a side of the cassette opposite that along which the motor is mounted. A reduction system, present as a thin gear train, is mounted within the housing between the motor and processing station along a third side of the cassette. This gear train not only delivers power forwardly from the motor to the processing station, but also can be "tapped" to provide the rearwardly directed kinematic logic required for various other control functions of the automatic camera. For instance, a controlled translational kinematic output is readily devised for providing a reflex mode converting function. Further, the gear train is so combined with the kinetic drive assembly as to derive photographic cycle monitoring and timing output information. The latter informational feature permits an associated control circuit to operate as a closed-loop system.

Another feature and object of the invention resides in the provision of an operator assembly latching and release function through the use of a timing output stage of the above-noted gear train. Through selective configuration and rotation of a cam surface coupled with this timing output stage, the operator assembly may be retained in its viewing mode orientation by a latching arrangement extending from the cam through the kinetic linkage and into the pivotal mounting of the operator assembly. By initially and briefly energizing the above-noted electric motor, the output stage can be activated to release the operator assembly latching engagement to permit conversion of the camera to an exposure mode orientation. Following an exposure interval, the motor drive system is re-energized to utilize the same output timing stage in conjunction with the kinetic linkage to cock or drive the operator assembly returning it to its initial viewing mode orientation and retaining it there in latching fashion.

Another feature and object of the invention is to provide a single-lens reflex camera of thin, compact construction which is fully automated, incorporating an electric motor drive in combination with a gear train and kinetic linkage. The latter motor driven gear train and kinetic linkage arrangement is operative to convert an operator assembly of the camera from a viewing mode orientation to an exposure mode orientation and to return the operator assembly to its initial viewing mode orientation at the conclusion of an exposure interval. The motor driven gear train assembly also is operative to provide rotative drive for a film processing station incorporating a pair of mutually rotatable process rolls. Processing of a film unit through these rolls occurs simultaneously with the above-described cocking function, returning the operator assembly to its viewing mode orientation. To assure a mandatory uniform driving rate at the processing rolls of the camera, the gear train is formed having two power flow circuits or branches, one coupled in driving relationship with the processing station and the other coupled in driving relationship with the timed output stage used for cocking and other control purposes. To assure that the operation of the latter power flow or branch circuit does not affect the drive rate uniformity of that circuit providing power for processing, the outputs of the two circuits are separated by a substantial reduction ratio.

A further advantage of the gear train and kinetic linkage assembly of the invention resides in its placement along the lengthwise thin dimension of the camera. Proper power and timing outputs are developed along the side of the camera as the gear train extends from a rearward operator assembly pivot. Appropriate power and timing can then be tapped at an intermediate circuit branch of the gear train to return translational or kinetic motion to the pivot to provide cocking and latching functions. With such an arrangement, the camera can be motorized and fully automated while still retaining the desirable dimensions necessary for cameras carried in the pocket of a garment.

Another object and feature of the invention is to provide a fully automated reflex camera incorporating automatic mode conversion, automatic exposure control and automatic motor driven film processing within each photographic cycle thereof. This camera incorporates a reflex operator assembly having a cocked position for operating the camera in a viewing mode, the assembly being movable during a photographic cycle into an erect position for operating the camera in an exposure mode. Spring means are utilized for urging the operator assembly to move toward its erect position to establish the exposure mode. The camera also incorporates an electric motor which is coupled in driving relationship with a gear reduction train which provides rotational drive not only for a processing station but also to establish an intermediate output stage having a predetermined period of rotation during each photographic cycle. The output stage is coupled with a cam assembly having a periphery with an initial high dwell portion juxtaposed to a sudden return portion and the terminus of a rising profile portion. A kinematic linkage is coupled through a follower in operative association with the cam as well as with the operator assembly. Through this coupling, the kinetic linkage retains or latches the operator means in its viewing mode orientation prior to the commencement of a photographic cycle. This is carried out by virtue of the contact of its follower with the initial high dwell portion of the cam. An initial energization of the electric motor rotates the cam to cause the kinetic linkage follower to fall across the sudden return portion and permit the operator assembly to move under the spring into its erect exposure mode orientation. Following an exposure interval, the motor is again energized to rotate the cam as well as drive rolls of the processing station through the gear train and cause the rising profile portion of the cam to move the kinetic linkage in a manner recocking the operator assembly, returning it to its viewing mode orientation. Switch means are incorporated with the kinetic linkage to de-energize the motor when the operator assembly has returned to its initial viewing mode orientation.

An additional object of the invention is to provide a resetting operation of the above-noted cam and kinetic linkage with the commencement of each photographic cycle. For instance, should the kinetic linkage follower not have returned to its initial position at the high dwell portion of the cam as a photographic cycle ends, at the commencement of a next succeeding photographic cycle, the cam will rotate until the sudden return portion is reached to signal as well as cause the commencement of operator assembly movement. Accordingly, switching operations actuated by the kinematic linkage take place at consistent or stabilized points within an operational cycle.

Other objects of the invention will in part be obvious and will in part appear hereinafter.

The invention accordingly comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a pictorial representation of the single-lens reflex camera according to the invention showing its compact folded configuration suitable for carrying in the pocket of a garment;

FIG. 2 is a pictorial representation of the single-lens reflex camera of FIG. 1 showing its erected shape with portions broken away to reveal internal structure;

FIG. 3 is a top view of the body or housing portion of the camera of FIG. 2 with portions broken away or removed to more clearly reveal the gear train and motor drive assembly thereof;

FIG. 4 is a side elevational view of the gear train of FIG. 3 with portions removed to reveal internal structure;

FIG. 5 is a rear fragmentary view of the motor and drive assembly of the camera of FIG. 2 with portions broken away to more clearly reveal internal structure;

FIG. 6 is a sectional view of portions of the drive system of FIG. 5 as taken through the plane 6—6 of FIG. 5;

FIG. 7 is an exploded perspective view of portions of the drive assembly of FIGS. 5 and 6;

FIG. 8 is a side elevational view of the camera of FIG. 2, similar to FIG. 4 but showing the orientation of components during an intermediate stage of a photographic cycle;

FIG. 9 is a side elevational view of the camera of FIG. 2 showing the orientation of components of the kinetic drive and gear assembly during a post exposure interval operation;

FIG. 10 is a displacement diagram of a cam as used in conjunction with the timing output stage of the drive assembly shown in FIGS. 2, 4, 8 and 9;

FIG. 11 is a schematic representation of the dual power flow or branch circuits of the gear train of the camera of the present invention;

FIG. 12 is a chart showing the relative actuation times of important components of the mechanism of the invention during a photographic cycle.

DETAILED DESCRIPTION OF THE INVENTION

Figure 13:
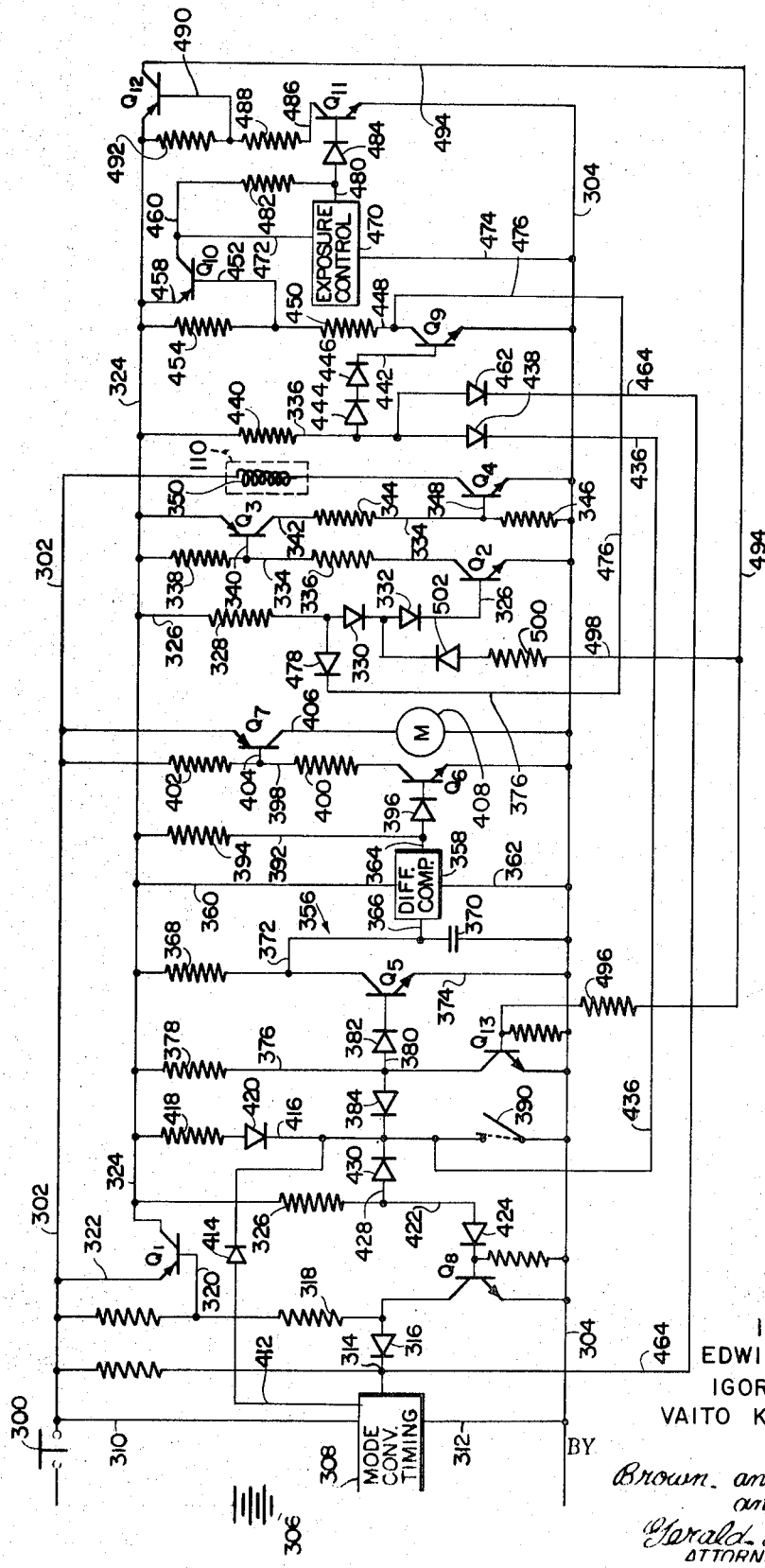
FIG. 13 is a circuit diagram illustrating a control system for use with the camera of the invention.

In the description to follow, the general structure of the camera is described initially (FIGS. 1 and 2) following which a photographic cycle carried out by the components thereof is outlined. To supplement the description of this photographic cycle, requirements of the control system of the camera are generally set forth. Next, the geometry of association of the operating components of the camera permitting its compact thin, foldable shape is described. Following the above, the spring loaded mounting of the reflex operator assembly of the camera is described in detail (FIGS. 5 – 7) to facilitate a following description of the gear train assembly of the camera and its attendent dual circuit torque multiplication separation feature (FIGS. 3, 4, 10 and 11). Next, the gear train and associated kinematic linkage providing for mechanical logic is detailed (FIGS. 4, 8 and 9). Following the above, a unique latching feature of the reflex operator assembly is described along with a phase switching operation carried out by the linkage. The interrelationship of all operating components of the camera is then described in detail in connection with a component activity chart based upon one revolution of a timing gear of the gear train (FIG. 12). Finally, a control circuit suited for operation with the mechanical features of the camera is described in connection with FIG. 13.

CAMERA - GENERAL STRUCTURE

Referring to FIG. 1, an automatic camera according to the present invention is illustrated in a configuration wherein it is folded for purposes of being carried in the pocket of a garment. Camera 10 is formed having a very thin and compact configuration, substantially all of its bulk being contained within a rectangularly shaped base 12. In the folded configuration shown, the upper surface of the camera 10 includes a rear wall 14 which is hinged at 16 to one end of the base 12. Located in folded position next to rear wall 14 is a forward wall 18 hinged thereto at 20. Forward wall 18 is, in turn, pivotally connected to an exposure control housing 22 through a hinge 24. When camera 10 is folded, exposure control housing 22 nests inwardly within base 12. Supported above the walls 14 and 18 is a top cap 26 of a collapsible optical entrance assembly as is illustrated in FIG. 2 at 28.

Referring additionally to FIG. 2, the camera 10 is shown in its erected state. Thus erected, exposure control housing 22 is withdrawn from its nesting orientation within base 12 so as to position an optical objective or taking lens assembly 32 for making an exposure. A photocell entrance assembly 34 is also oriented in conjunction with the field of lens assembly 32. Exposure housing 22 additionally incorporates a release or start button 36 which is manually depressed to commence a photographic cycle. In the erected configuration shown, rear wall 14 is supported by erecting linkages as at 40 in a position angularly extending from base 12 at hinge 16. By virtue of the latter connections, forward wall 18 is angularly oriented between hinges 20 and 24 to form the upward surface of the erected camera. When so erected, these components combine to form an exposure chamber indicated generally at 42. The lighttight integrity of chamber 42 is provided by a flexible, opaque bellows, a fragment of which is shown at 44.

Base 12 is configured at the bottom of exposure chamber 42 to receive and support a disposable film retaining cassette structure, a portion of which is shown at 50. Cassette structure 50 is of rectangular configuration and retains a stacked array of discrete film units, the uppermost one of which is positioned as at 52, in coincidence with the exposure plane of the camera 10. Light access to the uppermost film unit 52 is made through a rectangular opening or film frame formed within the cassette as at 54. To position the film cassette 50 properly within the base 12, frame members as at 56 are formed therewithin which communicate with the upstanding ridge of the film frame 54. Cassette 50 also contains a flat battery power supply in its lowermost portion which communicates with terminals (not shown) in the base 12. Additionally, the forwardmost peripheral side of the cassette 50 is formed having an egress opening or slot at 58 through which the uppermost film unit 52 automatically is removed for processing following its exposure.

Described in detail in a U.S. Pat. by E. H. Land, No. 3,415,646, entitled "Novel Photographic Products and Processes," film units as at 52 include all the materials necessary to produce positive photographic prints. In this regard, one feature of the units 52 resides in the provision of a rupturable container of processing fluid secured to the photosensitive composite in a position such that it is located near to slot 58. When the unit 52 is drawn through slot 58 and between pressure applying rolls 120 and 122, the container selectively ruptures and uniformly dispenses a processing fluid therewithin. Image-forming results from this processing procedure. The developing process is now well known in the art and involves the formation of transverse image-forming substances in an exposed photosensitive element of the unit accompanied by their diffusion in a manner forming a visible positive image. The processing fluid within each unit 52 includes an opacifying agent which is spread as a layer to provide a background for the photosensitive transfer image evolved during development. As may be apparent, such film units require a processing technique ensuring a properly regulated, smooth or continuous spreading of fluid to assure a uniformly developed image.

In the orientation shown in FIG. 2, the components of the camera 10 provide for its operation in a viewing mode in which framing and focusing are carried out by the operator. In this configuration, a reflex operator assembly, shown generally at 60, is retained in a spring loaded or cocked orientation over the film frame 54, blocking the passage of light therethrough. Operator assembly 60 is configured on one side (uppermost in FIG. 2) to support a viewing surface 62 which faces into the exposure chamber 42 when in a viewing operational mode. Assembly 60 supports a mirror or similarly specularly reflecting surface 64 upon its somewhat flat surface opposite viewing surface 62. The operator assembly 60 is coupled to the rear of base 12 through hinge extensions 68 and 70 positioned at each side of the rearward edge thereof. Turning momentarily to FIG. 5, these hinge extensions are seen to be journaled for rotation, respectively, about shafts 72 and 74. Shafts 72 and 74 are supported, respectively, from dual extensions 76 and 78 of the frame of base 12.

When in the viewing operational mode shown, camera 10 establishes an optical path extending from taking or objective lens system 32 within exposure housing 22 to a mirror or specularly reflecting surface (not shown) fixed within the exposure chamber 42 to the inward side of rear wall 14, thence to the viewing surface 62 upwardly facing from operator assembly 60. Viewing surface 62 is configured having a texture and optical design facilitating the focusing of the image of the scene to be photographed. This image may be viewed by the camera operator through optical entrance assembly 28. A configuration suited for viewing surface 62 is described and claimed in a copending application for U.S. Pat., Ser. No. 83,030, filed Oct. 22, 1970, by Nathan Gold, entitled, "Reflective Imaging Apparatus," and assigned in common herewith, while the assembly 28 and its related internal components are described in detail in a copending application for U.S. Pat. by James G. Baker, filed Dec. 15, 1970, entitled, "Reflex Camera and Viewing Device," Ser. No. 98,356 and assigned in common herewith.

During a viewing mode of operation, the exposure control system of the camera 10 provides for an open shutter condition with widest available aperture. This is achieved within the control program through the use of a dual bladed shutter shown generally at 90. Shutter 90 is structured having two mutually coacting blades 92 and 94 which reciprocally move by virtue of their coupling with a reciprocating beam 96. Blade 92 is coupled to one end of beam 96 at a pin and slot union 98, while blade 94 is coupled through a pin and slot union 100 at an opposite tip thereof. Blades 92 and 94 are formed having selectively tapered aperture openings which combine to define progressively varying apertures 102 as the beam 96 is rotated about its center point. An aperture 102 of the maximum dimension defined by the blades 92 and 94 is illustrated in FIG. 2. The size of the aperture at 102 will vary in dependence upon light levels and related exposure parameters during an exposure interval. Blades 92 and 94, respectively, additionally incorporate secondary tapered aperture openings 104 and 106 which overlap and mutually coact to define progressive apertures over a photocell or the like positioned behind entrance assembly 34. With such an arrangement, an input corresponding both to scene brightness and to the instant size of the aperture as at 102 may be supplied to a photosensing control network.

PHOTOGRAPHIC CYCLE - IN GENERAL

Aperture opening 102 is normally retained in its fully open condition by virtue of tension exerted by a spring 108 connected between beam 96 and the exposure control housing 22. Uppermost film unit 52 is isolated from light directed into the exposure chamber 42 during viewing and focusing procedures by operator assembly 60. Formed of materials opaque to light, the operator assembly 60 is dimensioned to be capable of covering film frame opening 54 in light sealing fashion.

The initial portion of a photographic cycle of camera 10 includes operational steps which convert the camera from the viewing operational mode shown in FIG. 2 to an exposure operational mode. Conversion is carried out by closing shutter 90 and pivotally moving operator assembly 60 to a position resting against the inward side of housing rear wall 14. This maneuver uncovers the exposure plane at 52 and establishes an altered optical path extending from lens system 32 to reflective surface 64 on the inward side of operator assembly 60, thence to the exposure plane at 52. Closing motion is imparted to blades 92 and 94 of shutter 90 from a solenoid 110 supported within the housing 22. Solenoid 110 is formed having a centrally disposed plunger 112, the comb-shaped end of which is pivotally attached in eccentric fashion to reciprocating beam 96. As the winding of solenoid 110 is energized, plunger 112 is retracted to rotate beam 96 and cause the shutter blades 92 and 94 to close the aperture at 102.

When operator assembly 60 has reached its fully erect position, an exposure interval is commenced by de-energizing the winding of the solenoid 110. With this de-energization, shutter blades 92 and 94 are permitted to slideably move in mutual correspondence under the drive of spring 108 to define a gradually increasing aperture opening at 102. Simultaneously, the subsidiary openings 104 and 106 of the shutter 90 admit a correspondingly increasing amount of light into the photo-sensing network of the control system of the camera. When an appropriate amount of light has been admitted for exposure of a film unit 52, the winding of solenoid 110 is again energized to terminate an exposure by withdrawing plunger 112 to rotate reciprocating beam 96 against the bias of spring 108.

As the photographic cycle continues, following each exposure interval, exposure chamber 42 is secured by maintaining the winding of solenoid 110 in an energized state for an interval of sufficient length to permit the camera 10 to reassume its viewing mode orientation. Shutter 90 is described and claimed in a copending application for U.S. Pat. by Vaito K. Eloranta, Ser. No. 68,919, entitled, "Exposure Control System," filed Sept. 2, 1970 and assigned in common herewith.

In addition to mode reconversion following an exposure interval, the camera 10 automatically processes an exposed film unit 52. In a preferred arrangement, this processing is carried out by automatically moving uppermost exposed film unit 52 through slot 58 and into engagement with the driven processing rolls 120 and 122 of a processing station indicated generally at 124. A pick mechanism (not shown) is utilized to impart the initial movement introducing film unit 52 between rolls 120 and 122.

CONTROL SYSTEM REQUIREMENTS - IN GENERAL

The number of process control steps performed by the mechanism of camera 10 to achieve fully automatic operation is somewhat significant. For instance, following viewing and focusing with the camera 10 in its viewing mode orientation, a photographic cycle is commenced with the depression of start button 36. This causes the shutter assembly 90 to close and secure the exposure chamber 42. Following an appropriate interval required to close the shutter 90, operator assembly 60 is moved to its erect, exposure mode orientation. When operator assembly 60 is so erected, shutter 90 regulates an exposure interval, following which shutter 90 is closed and retained in a closed position while the operator assembly 60 is returned to its cocked, viewing mode orientation. Simultaneously with the movement of operator assembly 60 into the latter position, the exposed film unit 52 is moved through processing station 124. As operator assembly 60 reaches its downward cocked position, shutter 90 is opened to its fullest extent and the entire control system is automatically shut down. Because of the programmed delays for securing exposure chamber 42 and for providing appropriate conversion between viewing and exposure orientations of operator assembly 60, the control system of the camera requires a physical monitoring of process steps as they occur as well as a powering capacity for physically carrying out all of the operations. Further, all of the above processing operations and their related control elements must be confined within a camera structure which can be folded to the thin, compact shape shown in FIG. 1.

DRIVE SYSTEM - GEOMETRY OF COMPONENT ASSOCIATION

An important feature of the present invention, providing for requisite compactness and thinness, resides in the relative placement of the power drive components for processing rolls 120 and 122 as well as for operator assembly 60. In particular, the processing station 124 is positioned along the forward edge or side of cassette 50 and the drive components are positioned at the opposite edge or side of the cassette 50 next to the hinged or pivotal connection of operator assembly 60.

Operator assembly 60 is spring driven from its viewing mode orientation into its exposure mode orientation and is cocked by an electrically powered drive system which simultaneously powers roll 122 of processing station 124. A distribution of power between processing and cocking is made through a thin elongate gear train shown generally at 126 extending from the motor drive at the rear of the camera to processing station 124 along a side or edge of cassette 50. Gear train 126 not only provides an accurately controlled drive for processing station 124, but also provides an output station for developing the drive required to cock operator assembly 60 as well as for mechanically unlatching it at the commencement of an exposure cycle. Additionally, this output station provides control over and physical monitoring of the progress of a photographic cycle as it is carried out.

REFLEX OPERATOR ASSEMBLY MOUNTING AND DRIVE

Referring to FIGS. 3 and 5, motorized drive components for powering gear train 126 are revealed in detail along with the spring-driven mounting of operator assembly 60. Motive power is derived from an electric motor 130 attached to the rear portion of frame 12 adjacent the rear edge of cassette 50. The output shaft 132 of motor 130 is connected to the first drive pinion 134 of gear train 126 through a supporting arrangement including a spring-type slip clutch 136. Spring clutch 136 is frictionally attached between output shaft 132 of motor 130 and the drive shaft 138 of pinion 134. Fixed to pinion 134, shaft 138 is rotatably supported within a bushing 140 fixed to an inner portion 144 of frame 12. An E-ring 142 is connected to shaft 138 within an appropriate groove formed in the circumference thereof. Spring clutch 136 is configured such that it will tend to unwind and release from frictional engagement between shaft 132 and shaft 138 should the load from gear train 126 exceed a predetermined limit. The incorporation of this form of clutch additionally facilitates the assembly of the entire drive unit.

Operator assembly 60 is driven between both of its operational positions by a four-bar linkage assembly depicted generally at 145. The constituent components of this four-bar linkage 145 commence with the pivotal coupling at shaft 72 of hinge extension 68 of the operator assembly 60. Hinge extension 68 is configured having a second bore retaining another shaft 146 spaced forwardly from shaft 72. Extension 68 additionally is formed having an access slot 148 within which pivotal connection between shaft 146 and a draw-down link 150 is effected. Draw-down link 150 is pivotally connected through a shaft 152 to the tip of dual arm portions 154 of a bell crank shown generally at 156. Forming the final component of the four-bar linkage 145, hub portion 158 of bell crank 156 is rotatably mounted upon the necked or stepped-down portion 160 of a cylindrical shaft 162. Portion 160 of shaft 162 is rotatably supported within a bushing 164 fixed, in turn, to an extension 166 of camera frame 12. An E-ring 170 restrains shaft 162 from lateral movement within its mountings. The opposite end of shaft 162 is rotatably supported with a bushing 168. Bushing 168 is retained within portion 144 of frame 12.

Referring additionally to FIG. 6, the operation of the bell crank assembly in driving operator assembly 60 into its exposure mode orientation and retaining the assembly 60 in its viewing mode orientation is more clearly revealed. For instance, operator assembly 60 is retained in its viewing mode orientation by virtue of the outward orientation of the dual arms 154 of bell crank 156. Operator assembly 60 is driven to its exposure mode orientation, as shown partially and in phantom at 60', by a driving force exerted from bell crank 156 through the linkage 145. The resultant orientations of bell crank 156 and draw-down link 150, respectively, are shown in phantom at 156' and 150'. As may be evidenced from the drawings, operator assembly 60 is driven into its exposure mode orientation as well as returned to its viewing mode orientation by forces exerted from bell crank 156 through draw-down link 150.

Operator assembly 60 is driven from bell crank 156 into its exposure mode orientation by force derived from a low-rate multi-turn torsion spring 172. A stationary end 174 of spring 172 is fixed or grounded to frame portion 144, while its opposite end 176 is configured to abut against a tang or extension 178 of a cylindrically-shaped sleeve 180.

Referring additionally to FIG. 7, sleeve 180 is generally configured as a hollow right cylinder having a thickened end portion 184 (FIG. 5), the internal surface of which is bored to fit over the stepped-up diametral portion 186 of shaft 162. Sleeve 180 is fixed to and co-rotatable with shaft 162 as a result of its connection thereto by pin 188. Beyond thickened portion 184, sleeve 180 is formed having a diameter suited to provide for its slideable coupling over hub 158 of bell crank 156. This same portion of sleeve 180 additionally is cut away to provide top and bottom abutting or key surfaces shown, respectively, at 190 and 192. When assembled in conjunction with bell crank 156, surface 192 of sleeve 180 will selectively abut against dual arm portions 154 of bell crank 156. During normal operation of the assembly, when spring 172 is loaded or wound, its movable end 176 abuts against tang 178 of sleeve 180, thereby urging it to rotate in a counter-clockwise direction as viewed in FIG. 6. Thus spring loaded, surface 192 of sleeve 180 is capable of exerting spring derived rotational force against arm portion 154 of bell crank 156 biasing the latter to move correspondingly. Accordingly, when shaft 162 is free to rotate, operator assembly 60 is driven by spring 172 into its viewing mode orientation.

Mounted coaxially with spring 172 over the central portion of shaft 162 is a spiral override spring 191. Located within the interior of sleeve 180, one end of 194 of spring 191 is connected within the thickened portion 184 of sleeve 180. The opposite tip 196 of spring 191 is connected to bell crank 156 by insertion within a slot 198 formed in hub portion 158. Spring 191 is selectively prewound and has a strength sufficient to urge the bell crank toward positioning contact surface 192 of sleeve 180.

With the arrangement thus described, when shaft 162 is rotated, rotational force will be transmitted through both the override spring 191 and sleeve 180 into bell crank 156. Rotation of sleeve 180 from shaft 162 also winds spring 172 from tang 178. As the united sleeve 180 and bell crank 156 are rotated, operator assembly 60 is repositioned by the four-bar linkage 145 into its viewing mode orientation adjacent the exposure plane at 52. Spring 191 provides a lost-motion or override function permitting the motor 130 to operate for a select interval following the seating of operator assembly 60 within its viewing mode position. This feature eliminates a need for close manufacturing tolerances of the control system and, additionally, provides a safety override should the operator assembly 60 be jammed during conversion from its exposure mode position. In the latter regard, it may be noted that the cutaway portion of sleeve 180 does not fully capture the extensions 154 of bell crank 156. As seen in FIG. 6, a spacing allowing about 45° of relative rotation is provided between surface 190 of sleeve 180 and arm portion 154 of bell crank 156.

Rotational force is imparted to shaft 162 through its connection with a drive bell crank 204 mounted upon shaft 162 outwardly from bushing 168. Bell crank 204 is fixed to portion 186 of shaft 162 by a pin 206 extending therethrough. Configured having an upwardly extending arm portion 208, the tip portion of bell crank 204 is bored at 210 to provide a pivotal connection with the pin 212 of a kinematic linkage with which it is associated.

THE GEAR TRAIN - TORQUE MULTIPLICATION SEPARATION

The thinness and compactness of the camera 10 is basically realized by the design feature of positioning processing station 124 along the forward edge of cassette 50; mounting motor 130 and spring drive for operator assembly 60 along the opposite parallel edge of cassette 50 and by incorporating thin gear train 126 with an associated kinematic linkage along a third edge thereof. Gear train 126 operates processing station 124 under critical rotational speed criteria, while its associated kinematic linkage develops cycle phase timing and requisite power outputs which are redirected toward the rear of the camera for the purpose, inter alia, of selectively manipulating operator assembly 60.

Referring to FIGS. 3, 4 and 11, gear train 126 and its associated kinematic linkage are revealed in more detail. Gear train 126 consists of two power flow circuits, one leading to processing station 124 and the other leading to an intermediate output stage for developing rearwardly directed control motion. Looking to FIG. 11, the first power flow circuit, extending from input or first drive pinion 134 to the processing station 124, is illustrated schematically. This power flow circuit must meet the critical requirement of providing smooth and continuous power flow into the driven roll 122 of processing station 124. Further, the nominal speed of rotation of roll 122 must fall within acceptable limitations in order to provide proper spreading of processing fluids within a film unit as at 52. The first circuit includes input gear 134, two reduction gears as at 220 and 222, five idler gears 224-232 and an output gear 234 coupled with roll 122 of processing station 124. As is evident from the drawings, gears 220, 222 and 226 are of a dual component variety to provide a requisite torque-multiplication factor within the compound gearing circuit.

The second power flow circuit of gear train 126 consists of input gear 134, three reduction gears 220, 222 and 226 and two idler gears 224 and 236.

The gear components within gear train 126 have maximum diameters somewhat corresponding with the height of base 12 of the camera and are mounted between one side 244 of an inner frame of the camera and an outer plate 246 extending along the length thereof. Plate 246 is mounted upon inner frame 244 by stand-off elements which are not illustrated in the interest of clarity. Inner frame 244 additionally serves as the mounting for roll 122 of processing station 124.

The dual power flow gear circuit arrangement permits gear train 126 to perform a variety of power and manipulative functions during a photographic cycle, while assuring a smooth and continuous rotational drive input to roll 122 of processing station 124. This continuous power input to processing station 124 is developed by configuring the second power flow circuit to have a reduction ratio or torque multiplication factor which is substantially higher than that of the first power flow circuit. Following is a tabulation showing exemplary gear design data establishing a torque multiplication factor separation for the two power flow circuits.

GEAR CIRCUIT TORQUE MULTIPLICATION FACTOR (T.M.F.)

|  | First Circuit |  |  |  | T.M.F. |
|---|---|---|---|---|---|
| Gears | 220 | 222 | 224 | 234 |  |
| Meshing | 134 | 220 | 222 | 232 |  |
|  |  |  |  |  | = 21.7/1 |
| Tooth Ratio | 50/12 | 50/16 | 50/12 | 20/50 |  |
|  | Second Circuit |  |  |  |  |
| Gears | 220 | 222 | 224 | 238 |  |
| Meshing | 134 | 220 | 222 | 226 |  |
|  |  |  |  |  | = 217/1 |
| Tooth Ratio | 50/12 | 50/16 | 50/12 | 48/12 |  |

With the above described separation of torque multiplication factors between the two circuits of the gear train 126, motorized activities required for moving operator assembly 60 and performing other functions will have a dismissable effect upon the requisite uniformity of the rotational drive into output gear 234. In this regard, it may be noted from the above exemplary tabulation that the torque multiplication factor (T.M.F.) for the first and second gear train 126 circuits are separated by an order of magnitude.

THE GEAR TRAIN - SECOND CIRCUIT AND KINEMATIC LINKAGE

Referring to FIG. 4, the output torque developed from the second power flow circuit at timing gear 238 is returned or transmitted back to shaft 162 by a kinematic linkage including an elongate ram 250 operating between and in conjunction with a radial or disc cam 252 and the arm portion 208 of drive bell crank 204. Cam 252 is fixed to and co-rotatable with timing gear 238. A radial cam follower 254, fixed to the inward side of ram 250, provides selective follower contact with the profile of cam 252. Appropriate radially directed contact between follower 254 and the profile of cam 252 is provided by a slideable connection between an elongate slot 256 formed within the forward portion of ram 250 and the axle 258 of timing gear 238. The opposite end of ram 250 is pivotally connected through pin 212 to the arm portion 208 of drive bell crank 204. As a result of the latter connection, a positive drive condition is available between follower 254 and the profile of cam 252. This positive drive results from a bias exerted from drive spring 172 through bell crank 156 and shaft 162 into drive bell crank 204. Spring 172 continuously biases ram 250 to urge follower 254 toward the profile of cam 252. Simultaneously, spring 172 exerts a bias through the earlier described four-bar linkage 145 for moving operator assembly 60 into its erect exposure mode orientation.

The second power flow circuit of gear train 126 is designed to drive timing gear 238 at a rate providing for its rotation only through 360° during a photographic cycle. As a result of this correspondence of period of rotation of the gear 238 with the duration of a photographic cycle, the kinematic linkage including ram 250 is capable of performing several regulatory functions. For instance, selective switching which provides for monitoring the program of a photographic cycle. To derive this regulation, the profile of cam 252 is selectively configured.

Referring to FIG. 10, a displacement diagram showing the action of cam 252 during the 360° of revolution of timing gear 238 is revealed. In the diagram, the zero and 360° positions represent the orientation of timing gear 238 as well as cam 252 at the commencement or end of any given photographic cycle. The diagram reveals that cam 252 incorporates an initial, high dwell portion 260 extending through about the first 10° of cam rotation. Juxtaposed to high dwell portion 260 is a sudden return portion 261 which drops off immediately following high dwell portion 260 and continues as a low dwell 262 from 10° to 90°. Preferably, contact is not made between follower 254 and cam 252 during this low dwell interval.

Intermediate high dwell portion 260 and low dwell portion 262, the cam profile incorporates a rising profile 264. Referring additionally to FIG. 4, the orientation of ram 250 and cam 252 when operator assembly 60 is in its viewing mode orientation is revealed. In this orientation, arm portion 208 of drive bell crank 204 is held in its maximum rearward position. When bell crank 204 is so positioned, bell crank 156 of the four-bar linkage 145, in turn, is retained in the solid line position shown in FIG. 6 as a result of its connection with shaft 162 through override spring 191. The downward position of bell crank 156 holds operator assembly 60 in its spring loaded, viewing mode orientation by virtue of its connection with bell crank 156 through draw-down link 150. Cam 252 and ram 250 serve to selectively latch the operator assembly 60 at its downward position. For instance, at the commencement of a photographic cycle, motor 130 is briefly energized to cause rotation of timing gear 238 through about 10°. As the sudden return portion 262 of the cam 252 is reached, ram 250 is released for translational movement under the drive spring 172 bias exerted through drive bell crank 204. Simultaneously, bell crank 156 of the four-bar linkage 145 is driven upwardly to rapidly raise the operator assembly 60 to its erect exposure mode orientation. Motor 130 is de-energized as the operator assembly 60 approaches its terminal position. The resultant orientation of cam 252, ram 250, the four-bar linkage 145 as well as operator assembly 60 is shown in FIG. 8. To assure that no dynamic impact of such nature as to introduce unwanted vibration into the camera 10 is present during the above described unlatching operation, the sudden return portion of the profile of cam 252 is "softened" as indicated at 261 in FIG. 10. This softening is provided by slightly rounding the contour of the cam at the point of fall-off. The latching and release operation carried out by cam 252 and ram 250 results in an important elimination of electromechanical latches and the like from the structure of the camera. In particular, such latches or the like necessarily would be mounted along the top surface of the camera frame. As such, they would contribute to an unwanted thickening of the housing at base 12. With the present arrangement, the latching step is carried out by multi-function components mounted along the side and back of the base 12.

FIG. 8 also reveals the presence of a small gap between the contact surface of follower 254 and the low dwell portion 262 of the profile of cam 252. This gap assures that ram 250 will be capable of traveling a distance sufficient to permit operator assembly 60 to fully rise to its exposure mode position against back wall 14.

KINEMATIC LINKAGE - PHASE SWITCHING

To provide a necessary correlation between mechanical events occurring during a photographic cycle and an electrical control network operating in conjunction with the mechanism thus far described, ram 250, operating in response to the single cycle of rotation of cam 252, provides a position responsive switch actuating function. In the embodiment described herein, such switching is used in a cycle phasing manner to provide for initial de-energization of motor 130 as well as system shut-down at the end of a photographic cycle.

Returning to FIG. 4, an embodiment of such a cycle phase switch is generally shown at 270. Switch 270 is configured having an electrically insulated base 272 which is fixed to the inner side of outer plate 246. Two electrically conductive resilient contacts 274 and 276 extend upwardly from switch base 272. Switch 270 further includes a mechanical motion amplifier configured as a lever 278 pivotally mounted upon a stud 280 extending from outer plate 246. Lever 278 additionally is configured to support an outwardly extending stud 282 which is positioned for selective contact with a tab 284 formed integrally with and extending downwardly from ram 250. Pivotal movement of lever 278 in a direction toward the front of the camera 10 is limited by a stud 286 fixed to and extending from outer plate 246. Switch 270 is selectively actuated in correspondence with the movement ram 250. For instance, when camera 10 is in a viewing mode configuration, ram 250 is in a position wherein tab 284 contacts stud 282 in a manner holding the lever 278 in a position causing contacts 274 and 276 to close a circuit. This orientation is shown in FIG. 4. With the initial energization of motor 130 and consequent release of ram 250 over the sudden return portion 262 of cam 252, tab 284 is removed from contact with stud 282 to permit lever 278 to pivot forwardly and cause contacts 274 and 276 to assume an open circuit orientation. The latter orientation is illustrated in FIG. 8. It may be noted from the foregoing description that switch 270 will remain closed for whatever length of time the high dwell portion of the periphery of cam 252 is moved across follower 254. Accordingly, operator assembly 60 is not released for movement into its exposure mode orientation until timing gear 238 and its associated cam 252 are in a predetermined angular orientation. This feature contributes to the simplification of the design of the camera, for instance, by minimizing a need for close tolerances and eliminating coasting errors which may otherwise accumulate from one photographic cycle to another.

THE TIMING GEAR CYCLE

Referring additionally to FIG. 12, the relative interoperation or phasing of ram 250, cam 252, processing station 124 and operator assembly 60 are graphically portrayed as they occur during one 360° cycle of timing gear 238. Ram 250 is depicted at 290 as being restrained by the high dwell portion of cam 252 for about 10° of rotation. Following the rapid fall-off of ram 250 permitting exposure assembly 60 to assume its erect exposure mode orientation, the low dwell portion 262 of cam 252 is rotated past follower 254 as exhibited at 292. Operation of cam 252 as well as its associated timing gear 238 during this period takes place following an exposure interval and re-energization of motor 130. The low dwell interval depicted at 292 is inserted within the cam 252 program for the purpose of completely isolating the second power flow circuit from the first power flow circuit at the commencement of the processing of a film unit 52 at station 124. When units as at 52 are initially introduced between rolls 120 and 122, a forwardly positioned pod containing processing fluid must be ruptured. To assure the presence of a proper torque output at station 124 during this introduction, no other loads are imposed upon motor 130 from gear train 126. The commencement and termination of the processing operation are depicted by the extent of bar 294. Note that the processing period 294 commences at about 54° of timing gear rotation and is completed at about 248°.

Following the release of operator assembly 60 for movement into its erect, exposure mode orientation, a photographic cycle continues with the opening of the blades of shutter 90 for a regulated exposure interval. At the termination of this interval, solenoid 110 is energized to close the shutter following which motor 130 is again energized. Energization of motor 130 causes timing gear 238 to resume rotation such that cam 252 rotates through low dwell as depicted at 292, following which follower 254 of ram 250 is again re-engaged by rising profile portion 264. Continued rotation of timing gear 238 during this period of a photographic cycle causes ram 150 to be driven rearwardly, in turn, driving the arm portion 208 of drive bell crank 204 rearwardly. An orientation of the gear train assembly 126 and its associated kinematic linkage during this cocking procedure is illustrated in FIG. 9. Returning to FIG. 12, the interval during which the rising profile portion 264 of cam 252 is moved before follower 254 is shown at 296. As depicted by phasing bar 298, the point of engagement of rising profile portion 264 with follower 254 commences at about 142° of timing gear 238 rotation. Cocking movement of operator assembly 60 from its exposure mode orientation toward its viewing mode orientation commences simultaneously with the start of ram 250 displacement. This movement is indicated by phasing bar 300.

A comparison of the period of displacement activity of ram 250 as depicted at 298 with the period of movement of the operator assembly 60 as indicated at 300, shows that ram 250 continues to be moved by cam 252 after operator assembly 60 has been re-seated. For instance, operator assembly 300 starts its downward movement at about 142° of rotation of timing gear 238 and comes to rest at 310°.

Turning to FIGS. 5 through 7, the operation of spring 192 in conjunction with the four-bar linkage 145 including bell crank 156 is portrayed. As ram 250 is urged rearwardly (toward the observer in FIG. 5) by the rising profile portion 264 of cam 252, shaft 162 is rotated, in turn, rotating or carrying spring 192 from its connection at 194. The opposite tip 196 of spring 192 rotates bell crank 156 outwardly to drive or pull operator assembly 60 downwardly through the four-bar linkage 145. Simultaneously, drive spring 174 is wound as a consequence of its engagement with tang 178 on sleeve 180. When operator assembly 60 is seated against frame 56 (FIG. 2) bell crank 156 halts. Continued movement of shaft 164 from the activity of cam 252 is taken up in override fashion by spring 191. The amount of override, which may vary in accordance with manufacturing tolerance variations, is taken up by a small relative separation between surface 192 of sleeve 180 and the arm extension 154 of bell crank 156. To prevent shock or the like when the four-bar linkage 145 is initially driven from drive spring 172 and from override spring 191 through contact surface 192, the rapid fall-off portion of cam 252 is rounded as described earlier at 261 in connection with FIG. 10.

Returning to FIG. 4, as timing gear 238 is rotated through one cycle of 360°, arm 278 of of switch assembly 270 closes contacts 274 and 276. This closure signals the control system of the camera that operator assembly 60 is down and that the timing gear 238 is in position for a next succeeding photographic cycle.

Closure of switch 270 de-energizes motor 130 as well as the control circuit of the camera, thereby automatically shutting down the entire system. Should the drive mechanism of the camera coast following shutdown, the above described override features of the erecting system for operator assembly 60 provides for correction in the next following photographic cycle. For instance, the operator assembly 60 will not be released until timing gear 238 has rotated to its proper position. Accordingly, no coasting errors or the like will accumulate from one photographic cycle to another.

Closure of the contacts of switch 270 provides for a complete shut-down of the control system of the camera. In this regard, the winding of solenoid 110 is de-energized to permit the blades of shutter 90 to resume their fully open status. Shutter blades 92 and 94 thus being open, camera 10 is returned to its viewing mode orientation.

CONTROL CIRCUIT

Referring to FIG. 13, a control circuit for causing the camera 10 to perform in the manner described is depicted. A photographic cycle is commenced with the depression of actuating button 34 to close a switch 300. When closed, switch 300 energizes main power lines 302 and 304 from a battery 306. As noted earlier, it is preferred that battery 306 be included as a component of disposable cassette 50. Energization of lines 302 and 304 initially enables a mode conversion timing function 308 from along lines 310 and 312. Conversion timing function 308 includes an R-C timing network and triggering circuit such as a differential comparator and is activated in conjunction with the movement of operator assembly 60. In this regard, the output 314 of timing function 308 remains at the ground potential of power line 304 until such time as the operator assembly 60 reaches its exposure mode configuration. For purposes of facilitating the description to follow, when the outputs of such triggering systems or comparators are at the ground reference potential of line 304, they are referred to as "low" and when they assume the voltage status of source line 302, they are referred to as being "high."

Output 314 is coupled through a diode 316, bias resistor 318 and line 320 to the base electrode of a PNP transistor $Q_1$. The emitter of transistor $Q_1$ is coupled through a line 322 to main power line 302 and its collector is connected with a secondary or logic power line 324. The "low" status at output 314 of mode conversion timing function 308 at the commencement of a photographic cycle serves to forward bias the base-emitter junction of transistor $Q_1$, thereby powering logic power line 324 from power line 302.

Energization of logic power line 324 from transistor $Q_1$ serves initially to energize the shutter solenoid 110 by forward biasing the base-emitter junction of an NPN transistor $Q_2$. Forward biasing current is directed to the base of transistor $Q_2$ from line 324 through a line 326, bias resistor 328, diode 330 and diode 332. The emitter of transistor $Q_2$ is coupled to reference power line 304, while its collector is coupled to power line 324 through line 334 including resistors 336 and 338. An "on" status at transistor $Q_2$, in turn, forward biases the base-emitter junction of a PNP transistor $Q_3$, the base of which is connected to line 334 and resistor 336 from line 340. The emitter of transistor $Q_3$ is connected with power line 324 and its collector is connected along a line 342 through resistors 344 and 346 to ground reference line 304. Conduction through line 342, in turn, forward biases the base-emitter junction of an NPN transistor $Q_4$, the base of which is connected to line 334 through line 348. The emitter of transistor $Q_4$ is coupled to ground reference line 304, while its collector is connected through the winding 350 of a shutter actuating solenoid to power line 302. Winding 350 forms a component of the earlier described shutter solenoid 110. Accordingly, solenoid 110 is depicted functionally by a dashed boundary 110 in the instant figure.

The time interval required for solenoid 110 to cause shutter 90 to close and thereby secure exposure chamber 42 is followed by an R-C timing network 356 comprised of resistor 368 and a capacitor 370 operating in conjunction with a differential comparator 358. Differential comparator 358 is coupled to logic power line 324 from along line 360, and to ground reference line 304 from along line 362. The comparator 358 is of conventional design, operating as a non-inverting amplifier. The output of comparator 358 at line 364 may assume a "high" or "low" status in response to the receipt at its input line 366 of a voltage signal, respectively, above or below a predetermined reference level. This signal is derived from the R-C timing network 356. Input 366 of differential comparator 358 is coupled to line 372 at a point within network 356 intermediate resistor 368 and capacitor 370.

Timing network 356 is designed having a time constant selected to reach the trigger level of differential comparator 358 in a period of time corresponding with the time required to assure that the blades of shutter 90 have moved from a fully open position to a fully closed position. During this timing interval, the output at line 364 assumes a "low" status. Timing operation of the network 356 is permitted as a result of the "off" status of an NPN transistor $Q_5$. The collector of transistor of $Q_5$ is coupled to line 372 intermediate resistor 368 and capacitor 370, and its emitter is connected through line 374 to ground reference line 304. Thus connected, transistor $Q_5$ is used to selectively shunt capacitor 370 and reset network 356. To forward bias transistor $Q_5$ and thereby shunt capacitor 370, biasing current is supplied to the base thereof from logic power line 324 through line 376, bias resistor 378, line 380 and diode 382. At the commencement of a photographic cycle however, this current is diverted through diode 384 across a closed switch 390 to ground reference line 304. Switch 390 is a phase cycle switch corresponding to switch 270 described earlier herein. Until operator assembly 60 is released from movement from its cocked position, switch 390 remains closed.

When timing network 356 achieves the threshold or reference voltage of comparator 358 following a period of time adequate to permit solenoid 110 to fully close the blades of shutter 90, the output at line 364 goes "high." A "high" output at line 364 terminates a clamping current flow from logic power line 324 into line 392, bias resistor 394 and output line 364 of differential comparator 358. As a result, current now passes through diode 396 to forward bias the base-emitter junction of an NPN transistor $Q_6$. The emitter of transistor $Q_6$ is connected with power reference line 304 and its collector is connected with power line 302 through a line 398 including bias resistors 400 and 402. As current is conducted through transistor $Q_6$, the base-emitter junction of a PNP transistor $Q_7$ is forward biased. The base of transistor $Q_7$ is coupled to line 398 from along line 404, while its emitter is coupled to power line 302. The collector of transistor $Q_7$ is coupled along a line 406 which, in turn, is connected to the terminals of a d.c. motor 408 and with ground reference line 304. Motor 408 corresponds with motor 130 of camera 10. With the forward biasing of transistor $Q_7$, motor 408 is energized and operator assembly 60 is released for movement into its exposure mode orientation. As the operator assembly 60 leaves its cocked orientation, switch 390 is opened to de-energize motor 408 and activate mode conversion timing function 308.

This initial de-energization of motor 408 is carried out by the reassertion of a forward biasing current flow along line 376, through bias resistor 378, line 380 and diode 382 to the base of NPN transistor $Q_5$. With the opening of the phase cycle switch 390, this forward biasing current is no longer diverted through diode 384 and the switch. As a consequence, timing capacitor 370 of timing network 356 is shunted to ground reference line 304 through line 374. With the shunting of capacitor 370, the output at line 364 of differential comparator 358 goes "low" and current at line 392 is diverted from the base of transistor $Q_6$ into the output 364 of differential comparator 358. As a consequence, the forward bias exerted at transistor $Q_6$ is removed and conduction through line 398 is terminated. As a result, the forward bias of transistor $Q_7$ is removed and motor 408 is de-energized. The initial energization of motor 408 is very brief, amounting to the period of time required for timing gear 238 to rotate through about 10°.

Early in a photographic cycle, while switch 390 is closed, the timing operation of mode conversion timing function 308 is restrained by a current diverting clamp including a line 412, diode 414, line 416 and switch 390. Line 416 is connected between logic power line 324 and reference level power line 304 and includes a current limiting resistor 418 and diode 420 as well as switch 390. With the opening of switch 390, line 412 no longer communicates with ground reference line 304 through line 416, and function 308 is permitted to commence timing the period required for operator assembly 60 to move from its viewing mode orientation into its exposure mode orientation.

An opening of switch 390 also permits the forward biasing of the base-emitter junction of an NPN transistor $Q_8$. The base of transistor $Q_8$ is connected with logic power line 324 through a line 422 including diode 424 and a bias resistor 426. Current flow through line 422 is diverted through line 428 and diode 430 into line 416 whenever switch 390 is closed. Accordingly, with the closure of switch 390, transistor $Q_8$ is "off." The emitter of transistor $Q_8$ is coupled to ground reference line 304, while its collector is connected through resistor 318 and line 320 to the base of transistor $Q_1$. A latching arrangement is provided thereby which serves to hold transistor $Q_1$ "on" as long as switch 390 is open.

The opening of switch 390 de-activates another clamping arrangement including line 436 which extends through a diode 438 and bias resistor 440 to logic power line 324. Coupled to line 436 at a point intermediate diode 438 and bias resistor 440 is a line 442 incorporating diodes 444 and 446 and extending to the base of an NPN transistor $Q_9$. The emitter of transistor $Q_9$ is connected to ground reference line 304 and its collector is connected through line 448, bias resistor 450 and line 452 to the base of a PNP transistor $Q_{10}$. A resistor 454 is connected in line 448 between line 452 and logic power line 324 to provide "turn-off" bias at transistor $Q_{10}$. The emitter of transistor $Q_{10}$ is connected to logic power line 324 through line 458 and its collector is connected with an exposure function power line 460.

Transistors $Q_9$ and $Q_{10}$ being thus interconnected, when transistor $Q_9$ is forward biased by current from line 442, through diodes 444 and 446, conduction to ground line 304 will be completed and the base-emitter junction of transistor $Q_{10}$ will be forward biased. However, when switch 390 is closed, current otherwise forward biasing transistor $Q_9$ is diverted along the clamping arrangement including line 436 and switch 390. When switch 390 is opened, another clamping arrangement including diode 462 and line 464 provides a current diverting path to the output 314 of mode conversion timing function 308 in order to retain transistor $Q_9$ in a reverse biased state while timing function 308 is timing out the period required for operator assembly 60 to reach its exposure mode orientation. During this period, the output at line 314 will be "low" and, as a consequence, clamping line 464 is permitted to provide a diverting function.

When timing function 308 has timed out the movement of operator assembly 60, output line 314 assumes a "high" status, thereby terminating the flow of current through line 464. As a consequence, biasing current is introduced from line 324 through line 436 to forward bias transistor $Q_9$. An "on" status at transistor $Q_9$ promotes a corresponding "on" status at transistor $Q_{10}$, thereby energizing line 460 from line 324 through line 458. Energization of line 460, in turn, energizes an exposure control function 470. Exposure control 470 is connected with line 460 from along line 472 and with ground reference power line 304 from along line 474.

Conduction across transistor $Q_9$ also activates a current diverting line 476 extending from line 326, through diode 478 and to the collector side of transistor $Q_9$. When activated, line 476 serves to divert biasing current passing through line 326 and bias resistor 328 from the base of transistor $Q_2$. As a result, transistor $Q_2$ is reverse biased into an "off" status simultaneously with the energization of exposure function power line 460. When transistor $Q_2$ is reverse biased, transistors $Q_3$ and $Q_4$ correspondingly are reverse biased. As transistor $Q_4$ is turned "off," winding 350 of solenoid 110 is de-energized to release the elements of camera shutter 90 for movement from a fully closed position toward an open position.

During the ensuing exposure interval, the output at line 480 of exposure control function 470 remains "low" until an exposure detecting function therein reaches the threshold value of a differential comparator also contained therein. When this threshold level is reached, the comparator triggers to rapidly change the output at line 480 to a "high" status. During an exposure interval, when the output at line 480 is "low," current is permitted to pass from line 460 through a bias resistor 482 to communicate with ground level through control function 470 and line 474. When the output at line 480 goes "high" at the termination of an exposure interval, current passes from line 460 through bias resistor 482 and diode 484 to the base of NPN transistor $Q_{11}$. The emitter of transistor $Q_{11}$ is connected to ground reference line 304 and its collector is connected through line 486, bias resistor 488 and line 490 to the base of a PNP transistor $Q_{12}$. A "turn-off" bias resistor 492 is connected between line 490 and power line 324. The emitter of transistor $Q_{12}$ is connected with logic power line 324 and its collector is connected to line 494. Line 494 is connected through a bias resistor 496 to the base of an NPN transistor $Q_{13}$ which functions to reactivate timing network 356. Line 494 additionally is coupled through line 498, bias resistor 500 and diode 502 to line 326 leading, in turn, to the base of transistor $Q_2$.

At the end of an exposure interval, the output of exposure control function 470 at line 480 will assume a "high" status to cause the forward biasing of transistor $Q_{11}$. When forward biased, transistor $Q_{11}$ draws the base-emitter junction of transistor $Q_{12}$ into a forward biased condition. As a consequence, current flows from line 324 through line 494. Line 494, in turn, energizes line 498 to cause a forward biasing of the base-emitter junction of transistor $Q_2$ from along line 326. As noted earlier, when transistor $Q_2$ is forward biased, transistors $Q_3$ and $Q_4$, correspondingly, are forward biased to energize the winding 350 of solenoid 110. This energization causes shutter 90 to reclose and terminate an exposure. When energized, line 494 also forward biases the base-emitter junction of transistor $Q_{13}$. The emitter of transistor $Q_{13}$ is connected to ground reference power line 304 and its collector is connected to line 376. When current from line 496 forward biases transistor $Q_{13}$, current from line 376 is diverted from line 380 and a forward bias at transistor $Q_5$ is removed. As a result, the shunt about timing capacitor 370 is removed and timing network 356 commences to time-out the period required for the blades 92 and 94 of shutter 90 to close. The output at line 364 of differential comparator 358 remains "low" until this shutter timing period terminates, at which time the output of the differential comparator 358 at line 364 assumes a "high" state. While the output at line 364 remains "high," the base-emitter junction of transistor $Q_6$ is forward biased from along line 392 and diode 396. When transistor $Q_6$ is forward biased, transistor $Q_7$, in turn, is forward biased to cause motor 408 to be re-energized from line 406 and power line 302.

As described in detail earlier in conjunction with motor 130, continued energization of motor 408 causes timing gear 238 to be rotated, thereby rotating cam 252 to drive ram 250 rearwardly. Additionally, rotational drive is provided for processing station 124. As operator assembly 60 reaches its viewing mode position and following an appropriate overtravel of spring 192, switch 390 (represented as switch 270 in the mechanical drawings) again is closed. When switch 390 closes, forward biasing current otherwise directed to transistor $Q_8$ is diverted through diode 430 and line 416 through the switch to power reference level line 304. Transistor $Q_8$ is reverse biased and, in turn, transistor $Q_1$ is reverse biased. The resultant de-energization of logic power line 324 shuts down the entire circuit to terminate a photographic cycle.

The control circuit described above ideally cooperates with the earlier described functional components of camera 10. In particular, the circuit performs throughout a complete photographic cycle in response to the actuation of the single-phase controlling switch as shown at 270. By operating in conjunction with a single cycle of rotation of cam 152, the system is capable of accommodating for variations of exposure intervals during a photographic cycle. Note further that the circuit responds to ram 250 actuation of switch 270 to energize motor 130 twice during a cycle. Further, when responding to switch 270 for the second time, the circuit is automatically shut down in preparation for a succeeding exposure cycle. Under the foregoing, it may be seen that the logic of the circuit desirably complements the mechanical logic of camera 10. The circuit of FIG. 8 is described in detail and claimed in a copending application for U.S. Pat. by Edwin K. Shenk, entitled, "Camera With Motorized Reflex Assembly," filed of even date herewith Ser. No. 134,725 and assigned in common herewith.

Since certain changes may be made in the abovedescribed photographic apparatus without departing from the scope of the invention herein, it is intended that all matter contained in the description thereof or shown in the accompanying drawings shall be interpreted as illustrative and not in a limiting sense.

We claim:

1. A hand-held photographic camera comprising:

housing means for supporting a supply of photographic film units for sequential exposure at an exposure station, said supply representing an occupied space having given sides and volume;

means for effecting the sequential exposure of said film units at said exposure station;

processing means mounted within said housing means adjacent one said side of said supply of film units occupied space and driveable to process individual ones of said film units following the said exposure thereof;

motor means mounted within said housing means adjacent a said side of said supply of film units occupied space opposite said one side for providing a drive output; and drive means supported within said housing means along a said side of said supply of film units occupied space adjacent said one side and connected between said motor means drive output and said processing means for driving said processing means from said motor means.

2. A hand-held photographic camera comprising:

housing means for supporting a quantity of photographic film units for sequential exposure at an exposure station, said housing means being articulated to fold from a fully functional erected configuration to a compact configuration approximating the shape of a thin parallelepiped with narrow side and end walls;

means for effecting the sequential exposure of said film units at said exposure station;

processing means mounted within said housing means adjacent one side of said film units and actuable to process individual ones of said film units following the said exposure thereof;

motor means mounted within said housing means adjacent a side of said film units opposite said one side for providing a drive output;

drive means supported within said housing means along a side of said film units adjacent said one side and connectable between said motor means drive output and said processing means for actuating said processing means from said motor means; and wherein after said housing means is folded said motor means lies adjacent one narrow end wall of said compact configuration and remains connectable through said drive means extending along a narrow side wall of said compact configuration to said processing means.

3. A hand-held photographic camera comprising:

housing means having components articulated to fold from an operational erected configuration to a compact configuration approximating the shape of a thin parallelepiped with narrow sidewalls, said components including base means for supporting a quantity of photographic film units for sequential exposure at an exposure station;

means for effecting the sequential exposure of said film units at said exposure station;

processing means mounted within said housing means and having an operational position adjacent one side of said quantity of film units, said processing means being actuable to process individual ones of said film units following the said exposure thereof;

motor means mounted within said housing means upon said base means adjacent a side of said film units opposite said one side for providing a drive output; and drive means mounted within said housing means and positioned along a side of said base means extending along another side of said film units adjacent said one side, so that said drive means extends along a said thin sidewall of said parallelepiped shape, said drive means being driveable from said motor means drive output and operative to actuate said processing means when driven.

4. The hand-held photographic camera of claim 3 in which said base means is configured such that said quantity of film units constitute, when supported therewithin, a substantial portion of the space defined therewithin.

5. The hand-held photographic camera of claim 1 wherein:

said housing means is articulated to fold from an operational erected configuration to a compact configuration approximating the shape of a thin parallelepiped with narrow side walls; and said drive means is supported within said housing such that it extends along a said narrow side wall of said shape.

6. A hand-held photographic camera comprising:

housing means for supporting a quantity of photographic film units for sequential exposure at an exposure station;

means for effecting the sequential exposure of said film units at said exposure station;

processing means mounted within said housing means adjacent one side of said film units and driveable at a predetermined rate to process individual ones of said film units following the said exposure thereof;

motor means mounted within said housing means adjacent a side of said film units opposite said one side for providing a drive output; and drive means supported within said housing means along a side of said film units adjacent said one side said drive means including a thin elongate gear train having an input connected with said motor means drive output and having one branch of selected output reduction ratio for driving said processing means at said predetermined rate and having another branch the output of which has a reduction ratio substantially greater than said select output reduction ratio, and kinematic drive means coupled in driven relationship with said gear train other branch output for providing a select control of instrumentalities within said camera.

7. The hand-held photographic camera of claim 1 in which said drive means includes a thin, elongate gear train connected between said motor means drive output and said processing means.

8. Photographic apparatus for exposing and processing photosensitive film units comprising:

exposure instrumentation means for focusing and exposing the image of a photographic subject upon a said film unit, said instrumentation means including a mechanism movable under spring bias from a cocked position into a terminal position;

means for processing a said film unit at a predetermined rate following the said exposure thereof;
a motor;
reduction gearing means coupled to be driven from said motor, said gearing means having one branch of select output reduction ratio for rotatably driving said processing means at said predetermined rate and having another branch the output of which has a reduction ratio substantially greater than said one branch select ratio;
kinematic drive means coupled in driven relationship with said reduction gearing means other branch output for selectively moving said exposure instrumentation means mechanism against said spring bias into said cocked position; and
control means for selectively actuating said exposure instrumentation means and said motor during a photographic cycle thereof.

9. The photographic apparatus of claim 8 in which said kinematic means is operative to selectively retain said exposure instrumentation means mechanism in said cocked position.

10. The photographic apparatus of claim 8 in which said kinematic means is operative to retain said exposure instrumentation means mechanism in said cocked position and to release said mechanism for movement under said spring bias in response to select rotation of said reduction gearing means other branch output.

11. The photographic apparatus of claim 8 in which said kinematic drive means is operative to commence said movement of said exposure instrumentation means mechanism against said spring bias into said cocked position subsequent to the said processing of a said film unit.

12. The photographic apparatus of claim 8 in which said kinematic drive means includes:
cam means coupled for co-rotation with said other reduction gearing means branch output; and
kinematic linkage means engageable with said exposure instrumentation means and said cam means for transmitting force therebetween.

13. The photographic apparatus of claim 12 in which:
said cam means is formed having a periphery with a high dwell portion; and
said kinematic linkage means includes a follower surface contactable with said cam means high dwell portion to selectively retain said exposure instrumentation means mechanism in said cocked position.

14. The photographic apparatus of claim 12 in which:
said cam means is formed having a periphery defining a high dwell portion in juxtaposition with a sudden return portion; and
said kinematic linkage means is contactable with said periphery, is operative to retain said exposure instrumentation means mechanism in said cocked position when in contact with said high dwell portion, and is operative to release said mechanism for movement under said spring bias when in operative association with said sudden return portion.

15. The photographic apparatus of claim 12 in which:
said cam means is formed having a periphery defining a low dwell portion and a rising profile portion; and
said kinematic linkage means is operatively associated with said low dwell portion when a said processing of a said film unit commences and is subsequently contactable with said rising profile portion during a said photographic cycle to effect said movement of said exposure instrumentation means mechanism against said spring bias into said cocked position.

16. The photographic apparatus of claim 15 in which said reduction gearing means other branch is configured to provide an output having a period of rotation selected as one revolution for each said photographic cycle.

17. A reflex camera comprising in combination:
optical path means having a viewing mode configuration and an exposure mode configuration for imaging a scene to be photographed at a focal plane;
operator means movable during a photographic cycle between terminal positions for causing said optical path means to be converted between said viewing mode and said exposure mode configurations;
means for biasing said operator means into a said terminal position providing said exposure mode configuration;
motor means for providing a drive output of given rotational velocity;
reduction means having an input coupled with said motor means for providing an output stage having a predetermined period of rotation when said drive output is at said given velocity;
cam means coupled for corresponding rotation with said reduction means output stage and having a periphery defining a predetermined rising profile portion and a sudden return portion;
means defining a kinematic linkage connected with said operator means and having a follower surface contactable in driven relationship with said cam means periphery, said linkage being movable to drive said operator means against said bias toward said terminal position providing said viewing mode configuration when said follower surface is driven from said rising profile portion and movable to effect said operator means movement under said bias when said sudden return portion is moved before said follower surface;
means for effecting the exposure of photosensitive material when said operator means is in a terminal position providing said exposure mode configuration; and
control means for actuating said motor means to cause selective rotation of said reduction means output stage.

18. The reflex camera of claim 17 in which said reduction means output stage period of rotation is selected as one revolution for each said photographic cycle.

19. The reflex camera of claim 17 in which said cam means periphery is configured to define a low dwell portion intermediate said sudden return portion and said rising profile portion, said low dwell portion being shaped to remain out of contact with said kinematic linkage follower surface, whereby said movement of said operator means fully into said terminal position providing said exposure mode configuration is assured.

20. The reflex camera of claim 17 in which:
said kinematic linkage means connection with said operator means includes a lost motion linkage; and
said cam means periphery rising profile portion is configured to drive said kinematic linkage from said follower surface an additional predetermined distance after said operator means is driven into said terminal position providing said viewing mode configuration, whereby seating of said operator means at said terminal position is assured.

21. The reflex camera of claim 20 in which said control means includes switch means actuable in response to said kinematic linkage movement for selectively energizing said motor means so as to derive sufficient rotation at said output stage to move said follower surface an additional predetermined distance.

22. The reflex camera of claim 17 further comprising housing means for supporting photographic film units for sequential exposure at said focal plane when said optical path is in said exposure mode configuration, said housing means being configured to support said motor means adjacent one side of said film units and support said reduction means along a side of said film units adjacent said one side.

23. The reflex camera of claim 22 wherein said reduction means is configured as an elongate gear train extending from said input along said adjacent side of said film units.

24. The reflex camera of claim 23 wherein said kinematic linkage includes an elongate ram supported within said housing means and translationally movable along said elongate gear train, said ram being configured to support said follower surface at one end thereof and connectable in force transferring relationship with said operator means.

25. The reflex camera of claim 17 in which said control means is operative to effect first and second energizations of said motor means during a photographic cycle, said first energization being of duration sufficient to effect movement of said cam means sudden return portion before said follower surface.

26. The reflex camera of claim 25 in which said reduction means is operative to driveably move said cam means rising profile portion against said kinematic linkage follower surface when said control means effects said second motor means energization.

27. The reflex camera of claim 26 in which said reduction means output stage period of rotation is selected as one revolution for each said photographic cycle.

28. The reflex camera of claim 17 in which:
said cam means periphery is configured to define a high dwell portion intermediate said rising profile portion and said sudden return portion; and
said kinematic linkage is operative to selectively retain said operator assembly in said terminal position providing said optical path means viewing mode configuration.

29. The reflex camera of claim 28 in which:
said reduction means is configured as an elongate gear train extending from said input; and
said kinematic linkage includes an elongate ram supported within said housing and translationally movable along said elongate gear train, said ram being configured to support said follower surface at one end thereof and connectable in force transferring relationship with said operator means.

30. A folding reflex camera comprising, in combination:
housing means for supporting photographic film units for sequential exposure at an exposure station;
operator means movable between a position adjacent said exposure station providing a viewing mode orientation of said camera and an erect position for providing an exposure operational mode;
means for biasing said operator means to move toward said exposure mode erect position;
motor means mounted within said housing means adjacent one side of said film units for providing a drive output of given rotational velocity;
processing means mounted within said housing means adjacent a side of said film units opposite said one side for processing individual ones of said film units following the said exposure thereof;
reduction means drivably connected between said motor means and said processing means for driving said processing means and including an intermediate output stage having a predetermined period of rotation when said motor means drive output is at said given velocity;
kinematic drive means operative between said intermediate output stage and said operator means for retaining said operator means in said position adjacent said exposure station and responsive to select rotation of said intermediate stage for releasing said operator means for movement by said biasing means into said erect position and for driving said operator means to said position adjacent said exposure station subsequent to an exposure of a said film unit;
means for effecting the exposure of a said photographic film unit when said operator means is in said erect position; and
control means for selectively actuating said motor means to drive said reduction means.

31. The folding reflex camera of claim 30 in which said operator means is pivotally mounted upon said housing means at a location near to said motor means mounting.

32. The folding reflex camera of claim 30 in which said reduction means output stage period of rotation is selected as one revolution for each said photographic cycle.

33. The folding reflex camera of claim 30 in which said reduction means is present as an elongate gear train connected in driven relationship with said motor means drive output, said gear train being configured having one circuit branch of select output reduction ratio for driving said processing means at a predetermined rate, and another circuit branch for providing said intermediate output stage and having a reduction ratio selected to derive said predetermined period of rotation.

34. The folding reflex camera of claim 33 in which said elongate gear train is positioned within said housing means along a side of said film units adjacent said one side.

35. The folding reflex camera of claim 33 wherein said kinematic drive means includes:
cam means coupled for co-rotation with said intermediate output stage; and
an elongate ram supported within said housing means, connectable in force transferring relationship with said operator means and having a follower surface contactable in driven relationship with said cam means.

36. The folding reflex camera of claim 35 in which said reduction means intermediate output stage period of rotation is selected as one revolution for each said photographic cycle.

37. The folding reflex camera of claim 35 in which:
said cam means is configured having a periphery defining a predetermined rising profile portion and a sudden return portion; and
said ram is operative to release said operator means for movement under said bias when said follower surface is operatively associated with said sudden return portion, and is further operative to urge said operator means into said position adjacent said exposure station when said follower surface is driven from said rising profile portion.

38. The folding reflex camera of claim 37 wherein said elongate gear train other circuit branch is configured having an output of reduction ratio substantially greater than said one circuit branch reduction ratio.

39. A reflex camera comprising in combination:
means for imaging a scene to be photographed at an exposure station;
an operator assembly having a cocked position adjacent said exposure station for operating said camera in a viewing mode and movable during a photographic cycle from said cocked position to an erect position for operating said camera in an exposure mode;
spring means for urging said operator assembly to move toward said erect position;
a motor;
gear reduction means coupled in driven relationship with said motor for providing a rotational output stage having a predetermined period of rotation during a said photographic cycle;
cam means rotatable in correspondence with said gear reduction output stage and having a periphery with an initial high dwell portion in juxtaposition with a sudden return portion and the terminus of a rising profile portion;
means defining a kinematic linkage having a follower surface contactable with said cam means periphery for retaining said operator assembly in said cocked viewing mode position when said follower surface is in contact with said high dwell portion, for releasing said operator assembly to move toward said erect position when said sudden return portion is operatively associated with said follower surface, and for returning said operator assembly to said cocked position when said rising profile portion is moved across said follower surface;
switch means actuable in conjunction with the movement of said follower surface from or into said high dwell portion;
control means for selectively energizing said motor and responsive to the said actuation of said switch means for terminating the said energization of said motor; and
means for effecting the exposure of photosensitive material at said exposure station when said operator assembly is in said erect position.

40. The reflex camera of claim 39 in which said gear reduction means output stage period of rotation is selected as one revolution for each said photographic cycle.

41. The reflex camera of claim 39 wherein said gear reduction means is configured as an elongate gear train.

42. The reflex camera of claim 39 wherein said kinematic linkage includes an elongate ram translationally movable along said elongate gear train, said ram being configured to support said follower surface at one end thereof and connectable in force transferring relationship with said operator assembly.

43. The reflex camera of claim 42 in which said kinematic linkage is connected with said operator assembly through a lost motion linkage; and
said cam means periphery rising profile portion is configured to drive said ram from said follower surface an additional predetermined distance after said operator assembly is driven into said cocked position providing said viewing mode, whereby seating of said assembly at said position is assured.

44. The reflex camera of claim 42 in which said cam means periphery is configured to define a low dwell portion intermediate said sudden return portion and said rising profile portion, said low dwell portion being shaped to remain out of contact with said follower surface, whereby said movement of said operator assembly fully into said erect position is assured.

* * * * *